United States Patent [19]
Van Der Meer

[11] 3,833,916
[45] *Sept. 3, 1974

[54] PHOTOGRAPHIC CAMERA SUPPORT
[75] Inventor: Jan Van Der Meer, Enschede, Netherlands
[73] Assignee: Polaroid Corporation, Cambridge, Mass.
[ * ] Notice: The portion of the term of this patent subsequent to Jan. 9, 1990, has been disclaimed.
[22] Filed: Jan. 31, 1973
[21] Appl. No.: 328,497

[52] U.S. Cl. ................................ 354/293, 352/243
[51] Int. Cl. ............................................ G03b 17/56
[58] Field of Search .......... 95/86; 352/243; 354/293

[56] References Cited
UNITED STATES PATENTS

| | | | |
|---|---|---|---|
| 2,624,252 | 1/1953 | Judd | 95/86 |
| 2,719,469 | 10/1955 | Sanford | 95/86 X |
| 3,291,179 | 12/1966 | Lang | 95/86 X |
| 3,575,098 | 4/1971 | Jones | 95/86 |
| 3,691,925 | 9/1972 | Shinkle | 95/86 |
| 3,709,119 | 1/1973 | Van Der Meer | 95/86 X |

Primary Examiner—Samuel S. Matthews
Assistant Examiner—E. M. O'Connor
Attorney, Agent, or Firm—Alfred E. Corrigan

[57] ABSTRACT

A simple, relatively inexpensive attachment for use with a photographic camera which does not have provision for tripod attachment, preferably a camera which has a configuration such that the optical axis of the camera lens is in a non-parallel orientation with respect to the supporting base of the camera. The attachment permits a realignment of the optical axis of the camera lens to a horizontal position whereby it may be conveniently positioned on a flat surface and/or coupled with a conventional tripod. The attachment comprises a flat rectangular plate portion which can be inserted into channels on the back of the camera. Disclosed is an embodiment where a portion of the attachment is hinged for portability.

14 Claims, 5 Drawing Figures

PATENTED SEP 3 1974

PHOTOGRAPHIC CAMERA SUPPORT

BACKGROUND OF THE INVENTION

1. Field of the Invention

This invention relates to a photographic apparatus, and more specifically to a novel structure for transforming a hand-held camera of a given configuration to a firmly mounted instrument whereby desired positioning of the camera may be readily obtained.

2. Description of the Prior Art

In many applications of certain types of photographic cameras, it is necessary and desirable to provide a support structure which allows positioning and holding of cameras in some predetermined position. For example, when an automatic camera is hand-held during the taking of photographs requiring a time exposure, unacceptable results frequently may be obtained due to unavoidable camera motion during the period the camera's shutter remains open. Similarly, where photographs of a scene are desired, identical results may not be obtained without the assistance of some means of fixedly positioning the photographic camera.

An accepted method of providing such stability is usually performed by a conventional tripod fixture attached to the camera by a tripod socket provided on or in the base of the camera. Some cameras, particularly relatively low cost, non-metallic photographic cameras as exemplified by the film pack cameras designated "Colorpack II" and "Colorpack 80" sold by Polaroid Corporation, Cambridge, Massachusetts, U.S.A. do not have the tripod sockets.

Cameras with which the subject invention may be utilized are described in detail in U.S. Pat. Nos. 3,498,197 issued Sept. 5, 1967 in the name of James M. Conner et al. and 3,709,119 issued Jan. 9, 1973 in the name of the present applicant.

BRIEF SUMMARY OF THE INVENTION

The present invention provides a support structure for holding a photographic camera in a desired position. The structure provides means for mounting the camera to a tripod while being simple in use and economical in construction.

In order to provide for these and other conveniences, a camera attachment has been designed which utilizes as means for attachment to the camera an existing accessory storage area, including a pair of channels, present in a rear wall of the camera. Additionally, the camera attachment may be used to position the camera's optical axis parallel with the horizon when the camera is placed on a horizontal surface, should a tripod be unavailable or its use undesirable.

The camera attachment has an advantage of being easily installed and removed without recourse to sophisticated mechanical gadgetry and does not require any structural changes to be made on the photographic camera.

In a particularly useful embodiment, the camera attachment includes a short upright support member which provides means for counterbalancing a force applied along the line of action of a shutter release actuator located substantially forward from the center of gravity of the camera.

It is, therefore, a principal object of this invention to provide a device for converting at will a hand-held photographic camera to a horizontally mounted, firmly supported apparatus.

A further object is to provide means for fastening the invention to a tripod; therefore providing a means for coupling a photographic camera with a tripod.

It is another object to provide an adapter for use in conjunction with a photographic camera having a configuration such that the optical axis of the camera is directed towards, not parallel with, a supporting horizontal surface upon which it is placed.

Still another object is to provide a tripod adapter which provides counter-balancing support for a camera having a shutter release actuator at a distance substantially forward from the center of gravity of the camera.

A further object is to provide support for a photographic apparatus which is simple, economical in manufacture, rugged and durable in use.

A further object and feature of the present invention is to provide a camera attachment for use in conjunction with a photographic camera whereby the camera, when attached thereto, is securely held in a position such that the optical axis of the camera is parallel with the horizon and firmly supported in a vertical plane along the line of action of the shutter release actuator disposed substantially forward of the center of gravity of the camera; the attachment providing means for coupling the camera to a tripod.

Other objects of the invention will in part be obvious and will in part appear hereinafter.

BRIEF DESCRIPTION OF THE DRAWINGS

Novel features that are considered to be characteristic of the invention are set forth with particularity in the appended claims. The invention itself, however, both as to its organization and its method of operation, together with additional objects and advantages thereof, will best be understood from the following description of the preferred embodiments read in connection with the accompanying drawings, wherein like numbers have been employed in the different figures to denote the same parts and wherein:

DETAILED DESCRIPTION OF THE INVENTION 9

Figure 1:
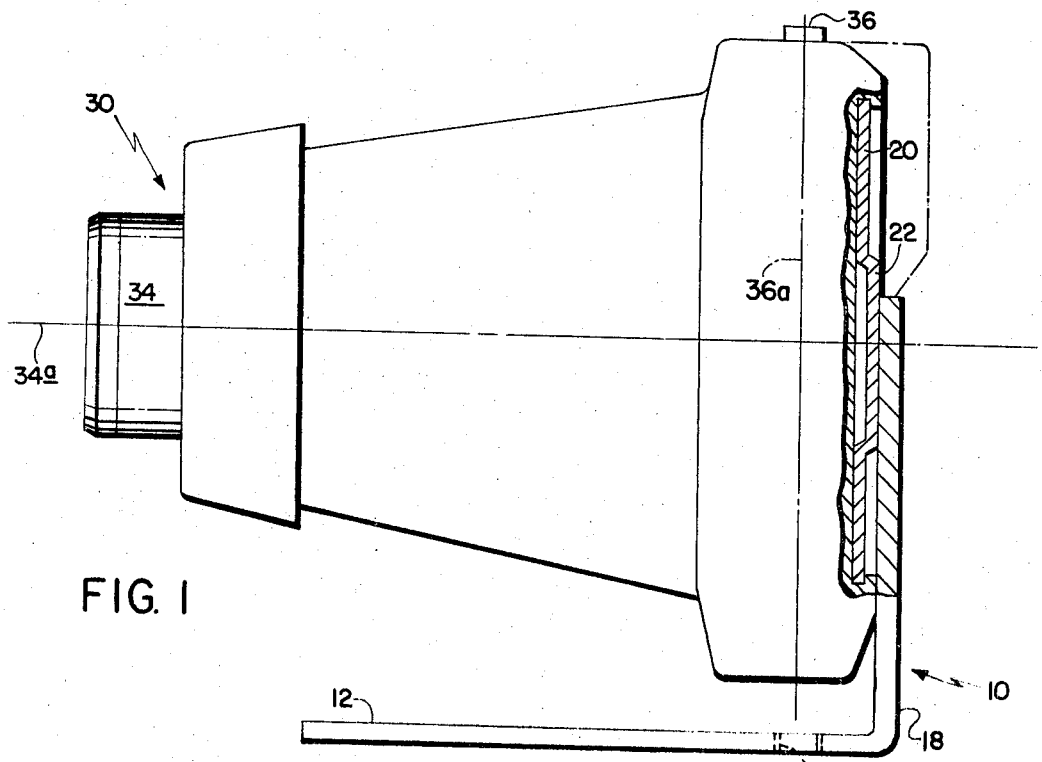
FIG. 1 is a diagrammatic view of one embodiment of the present invention attached to a camera.
Figure 2:
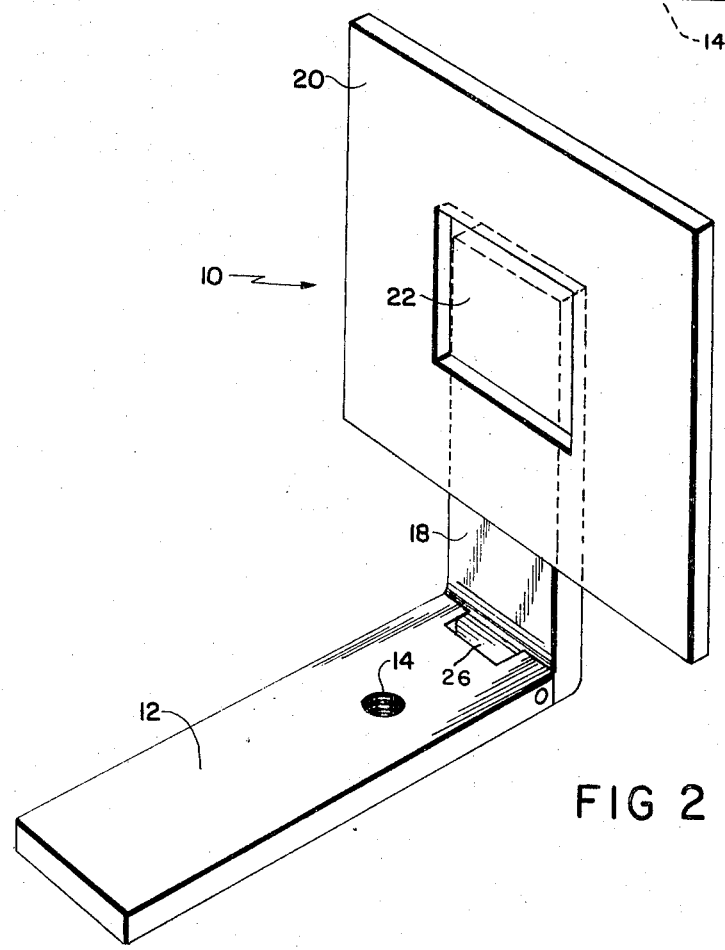
FIG. 2 is a perspective view of a slightly modified version of FIG. 1 including a hinge and shown in a fully erected upright position.
Figure 3:
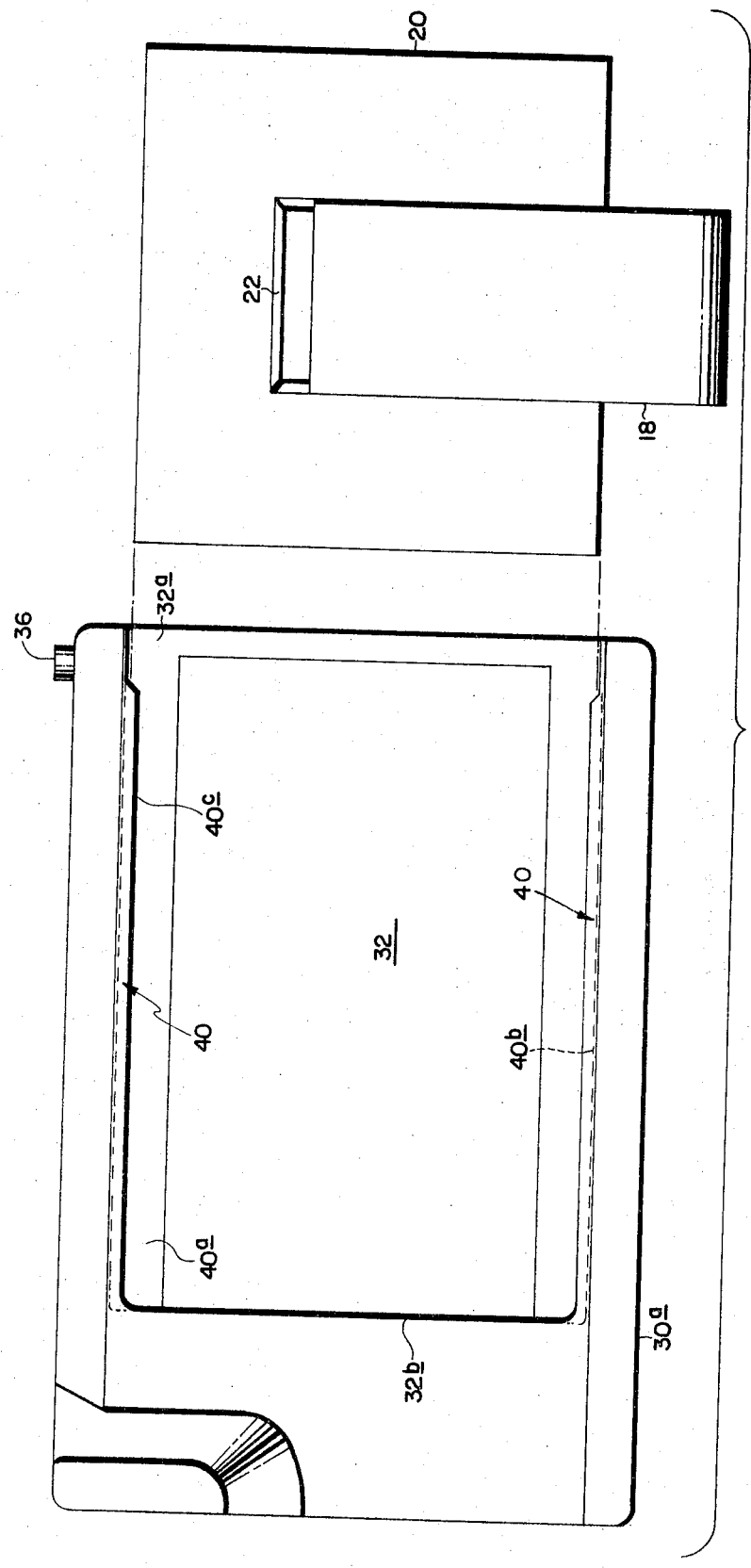
FIG. 3 is a diagrammatic rear view of the embodiment and the camera shown in FIG. 1.

FIGS. 1, 2 and 3 read together to show a camera attachment 10 and a method of attaching it to a photographic camera 30. Optical axis 34a of lens assembly 34 is shown parallel with the base 12 of the camera attachment 10 when attached thereto. Shutter release actuator 36 acting along a portion of line of action 36a is positioned close to the supported end of the photographic camera 30.

The camera attachment 10 comprises a base 12 including a standard threaded bore 14 therein for receiving a mounting screw of a conventional tripod, a support member 18 having a substantially flat plate-like member 20, and a smaller embossment 22 adapted to provide clearance between a rear wall 30a of the camera 30 and the support member 18 when attached to the camera 30.

The manner in which the camera attachment 10 is attached to the camera 30 is best seen in FIG. 3. The rear wall 30a of the camera 30 has an open end 32a which permits slideable insertion of plate-like member 20 into recessed area 32. The insertion of plate-like member 20 is terminated when its leading edge contacts the closed extremity 32b formed within the surface thereof. When the camera 30 is properly mounted upon the attachment 10, the threaded bore 14 is positioned below the center of gravity of the camera 30, in a vertical plane passing through the shutter release actuator 36. As a result, the camera 30 is solidly supported and may be fastened to a conventional tripod or placed upon a flat surface such as a table.

The present invention eliminates previous restrictions placed on the camera 30 having a configuration illustrated in FIG. 1. The optical axis 34a of the lens assembly 34 forms an acute angle with the flat surface when the camera 30 is placed upon such a surface for support.

The recess area 32 includes a pair of channels 40 formed by an inner bearing surface 40a, an outwardly projecting side surface 40b extending from the surface 40a, and an outer bearing surface 40c extending from surfaces 40b so as to overlie surfaces 40a. The channels 40, as thus described, are adapted to slideably receive and frictionally engage the plate-like component 20 of the upper suspension member 18. It is this engagement which holds the camera attachment 10 to the photographic apparatus 30.

In FIG. 3 the camera attachment 10 is shown as viewed by the assembler. The various components of the camera attachment 10, the plate-like member 20, the small embossment 22 and the support member 18 are presented as an assembly. The attachment 10 may appropriately be formed of a plurality of rectangular metallic members whereby the members being welded, soldered, or cast provide a strong rigid assemblage.

Figure 4:
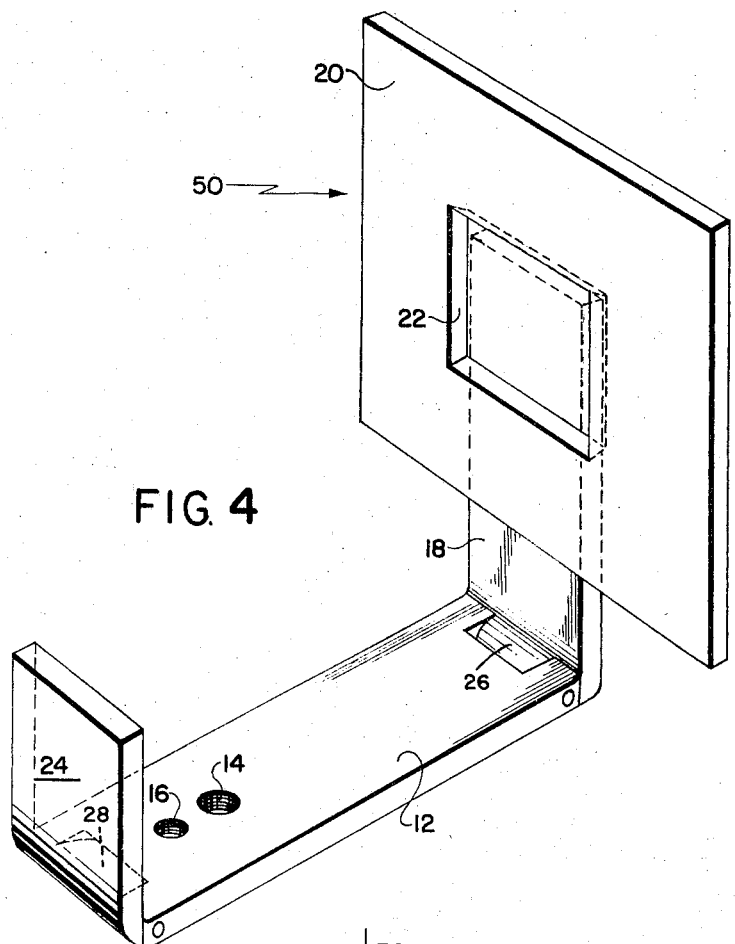
FIG. 4 is a perspective view of a preferred embodiment of the present invention including a pair of hinges and shown in a fully erected upright position.
Figure 5:
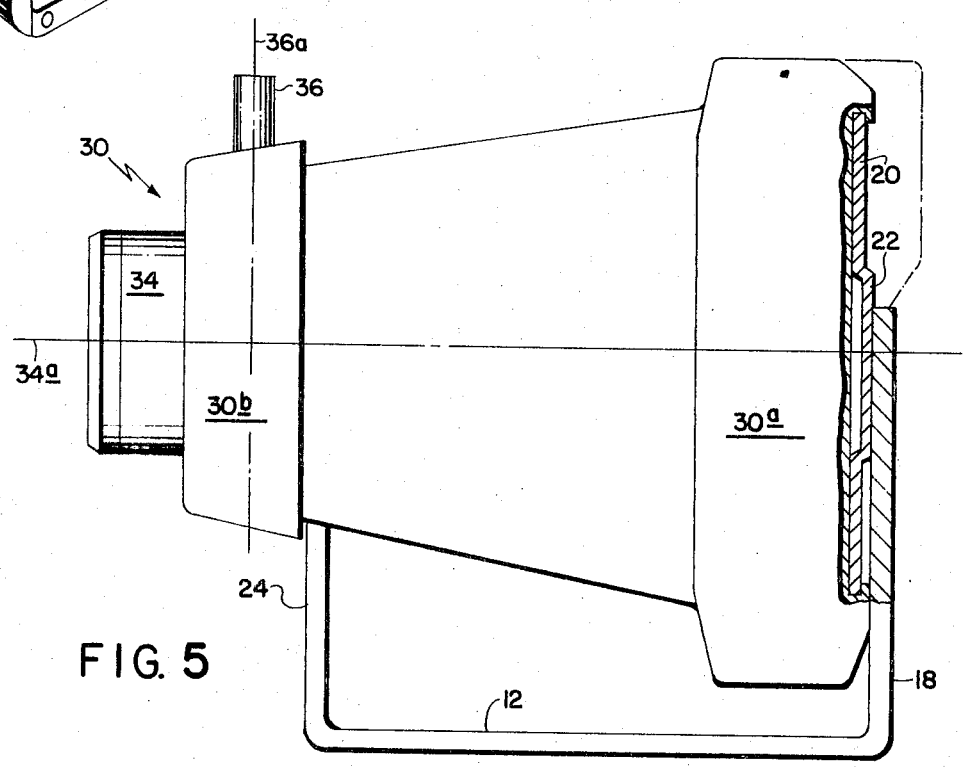
FIG. 5 is a diagrammatic view of a slightly modified version of the preferred embodiment of FIG. 4 shown attached to a camera.

FIGS. 4 and 5 illustrate preferred embodiments of the invention, a camera attachment 50 is illustrated comprising a base member 12a, support member 18 including plate-like member 20, and a short upright support member 24. The attachment 50 is constructed of any rigid material, preferably metal. The support member 18 and the short upright support member 24 are preferably formed integral with the base member 12 to provide maximum strength as shown in FIG. 5. Plate-like member 20 includes a small embossment 22 which is attached to the support member 18 in a secondary operation. The base member 12 has American Standard and/or International Standard threaded bores 14 and 16 therein for accepting mounting screws of foreign and domestic tripods.

The preferred embodiment of the invention is shown in assembled relation with a camera 30 having a shutter release actuator 36 disposed substantially forward of the center of gravity of the camera 30 in FIG. 5. The upright member 24 is positioned against the rear wall of the shutter housing 30b to support the front end of the camera 30 close to a vertical plane passing through shutter release actuator 36 thereby eliminating camera motion when a load is applied along line of action 36a of the actuator 36 during the taking of pictures. The upright member 24 further prevents the channels 40 (as viewed in FIG. 3) formed in the rear portion 30a of the camera 30 from receiving all of the strain from the weight of the camera and developing fatigue failure and/or deforming as a result of the bearing surfaces of the plate-like member 20 and the outwardly projecting side surface 40b of the channels 40.

Bores 14 and 16 are located close to the short upright support member 24 thereby positioning the tripod support member 24 thereby positioning the tripod close to the camera front and almost directly below the shutter release actuator 36 such that the camera 30 is further supported in the vertical plane passing through the shutter release actuator 36.

It should be noted that camera attachments 10 and 50 are not limited to use with the aforementioned cameras. The plate-like member 20 may be configured and the spacing between the plate-like member 20 and the short upright support member 24 may be adjusted to accommodate the configuration of any camera having a channelled recess therein.

This invention may be practiced or embodied in still other ways without departing from the spirit and essential character thereof. Examples of such a modification are shown in FIGS. 2 and 4 wherein support member 18 is attached by a hinge 28 to base member 12 and the short upright support member 24 shown in FIG. 4 is attached by a hinge 26 to the base member 12 providing a suitable hinge and locking arrangement whereby a knockdown, readily transportable camera attachment is provided which may be erected for use and subsequently collapsed for ease of portability.

It should become obvious to those skilled in the art there are a variety of ways in which to form a camera attachment for a photographic camera of the type herein disclosed. The attachments 10 and 50 are of a simple and uncomplicated design providing both easy mounting and removal of the attachment from the photographic camera, coupling of a tripod with the camera which does not include a built-in means for tripod attachment, and provides, with optional tripod support, a rigid structure whereby the optical axis of an attached camera is parallel to any flat surface upon which it is placed.

It will be understood that the subject invention may be modified in certain aspects without departing from the spirit or character thereof. The preferred embodiments described herein are, therefore, to be regarded as illustrative and not restrictive, the scope of the invention being indicated by the appended claims, and all variations which come within the meaning of the appended claims are intended to be embraced therein.

What is claimed is:

1. A camera attachment for receiving and supporting a camera including a housing having channel means therein to slidably and supportably couple the camera to said attachment, thereby adapting the camera to photographic uses requiring the camera to be rigidly mounted in a fixed position with the optical axis thereof parallel with the horizon, said attachment comprising:

a substantially flat rectangular base member;
a support member substantially perpendicular to said base member; and
means on said support member configured to be received by the channel means on the camera thereby coupling the camera with said attachment such that the optical axis of the camera is parallel with said base member.

2. A camera attachment as defined in claim 1 further comprising:
   a short upright support member substantially perpendicular to said base member providing support beneath a front portion of a camera having a shutter release actuating means disposed on the front portion thereof substantially forward of the channel means; and
   means for coupling the camera to a tripod.

3. A camera attachment as defined in claim 2 wherein said base member, said support member and said short upright support member are in the form of rigid fixedly interconnected appendages.

4. A camera attachment as defined in claim 2 wherein said means for coupling the camera to a tripod is provided by said base member having a bore therein through which said attachment may be coupled to a tripod, said bore being disposed close to a vertical plane passing through the shutter release actuating means.

5. A camera attachment as defined in claim 2 wherein said means for coupling the camera to a tripod is provided by said base member having a plurality of bores of various diameters therein through which said attachment may be coupled to a variety of tripods, said bores being disposed close to the vertical plane passing through the shutter release actuating means.

6. A camera attachment as defined in claim 1 wherein said means on said support member is a rigid fixedly interconnected plate-like member configured to be slidably engaged by the channel means on the camera, said plate-like member coupling and positioning the camera on said attachment for photographic operations.

7. A camera attachment as recited in claim 6 wherein said base member and said support member are in the form of rigid fixedly interconnected appendages.

8. A camera attachment as defined in claim 6 wherein means are provided on said attachment for limiting the longitudinal movement of the camera when the camera is mounted on said attachment.

9. A camera attachment as defined in claim 8 wherein said means for limiting the longitudinal movement of the camera is formed by the surface edges of said plate-like member on said support member being frictionally retained within the channel means on the camera.

10. A camera attachment as defined in claim 1 wherein a knockdown, readily compacted, transportable attachment is provided by means for erecting and collapsing said support member, said means joining said base member and said support member to each other.

11. A camera attachment as defined in claim 1 wherein said attachment provides means for coupling a camera to a tripod, the camera having shutter release actuating means disposed in a plane substantially parallel to a plane passing through said support member.

12. A camera attachment as defined in claim 11 wherein said means for coupling the camera to a tripod is provided by said base member having a bore therein through which said attachment may be coupled to a tripod, said bore being disposed close to a vertical plane passing through the shutter release actuating means.

13. A camera attachment as defined in claim 11 wherein said means for coupling said camera to a tripod is provided by said base member having a plurality of bores of various diameters therein through which said attachment may be coupled to a variety of tripods, said bores being disposed close to the vertical plane passing through the shutter release actuating means.

14. A camera attachment for receiving and supporting a hand-held camera of the type lacking tripod attachment means, said camera including a housing having a channeled recess of a given width and length formed therein, said attachment adapting said camera to photographic uses requiring said camera to be rigidly fastened in a fixed position with the optical axis thereof parallel with the horizon, said attachment comprising:

a substantially flat rectangular base member;
   a support member substantially perpendicular to said base member, said support member including a plate-like member in parallel alignment with said support member, said plate-like member being configured to be slidably engaged by the channeled recess whereby the camera is positioned on said attachment such that the optical axis is parallel with said base member;
   a short upright support member substantially perpendicular to said base member providing support beneath a front portion of the camera; and
   means in said base member for coupling said attachment to a tripod.

* * * * *